INVENTOR.
WAYNE H. ROYER
BY Otto Moeller
Attorney

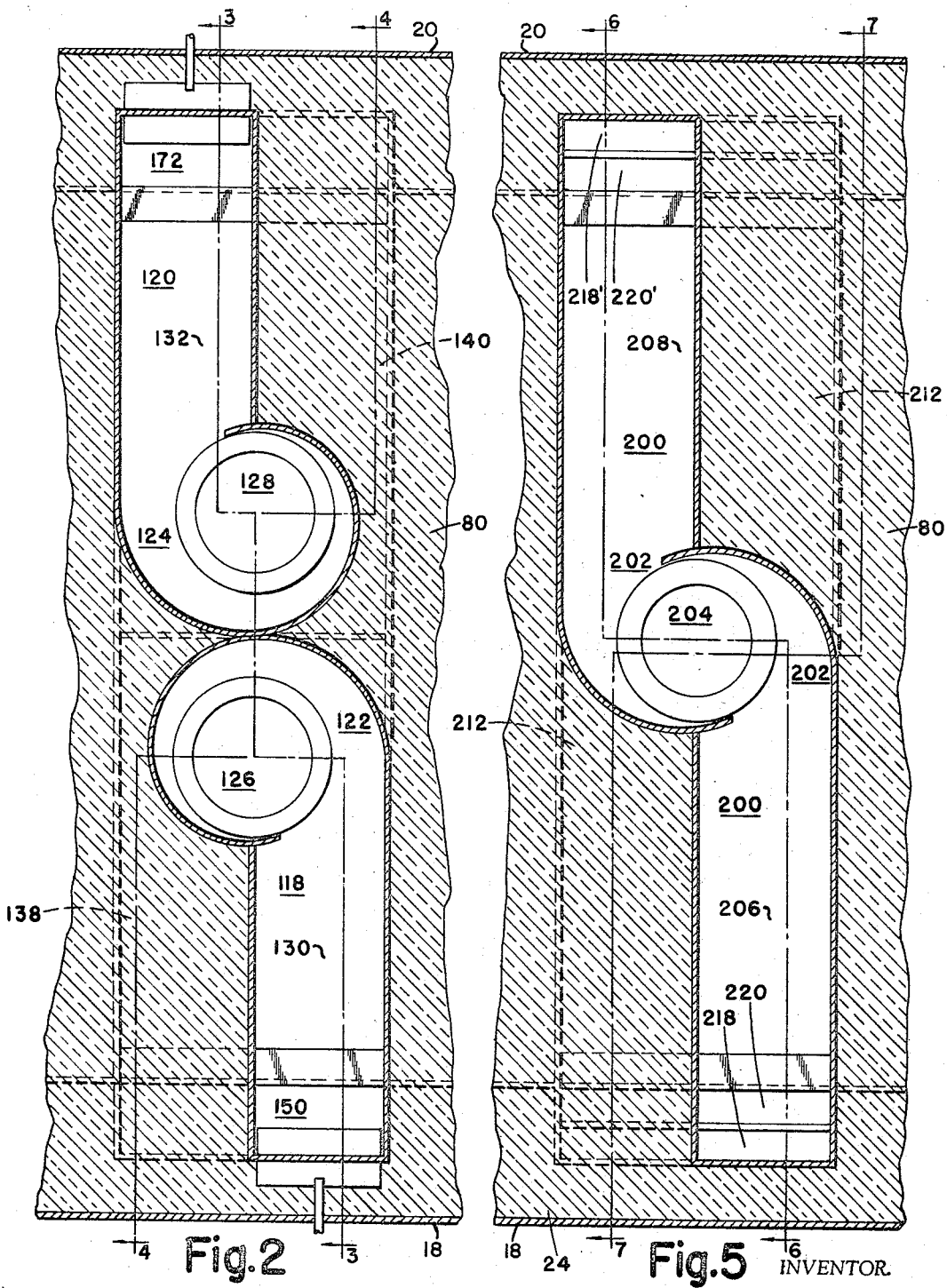

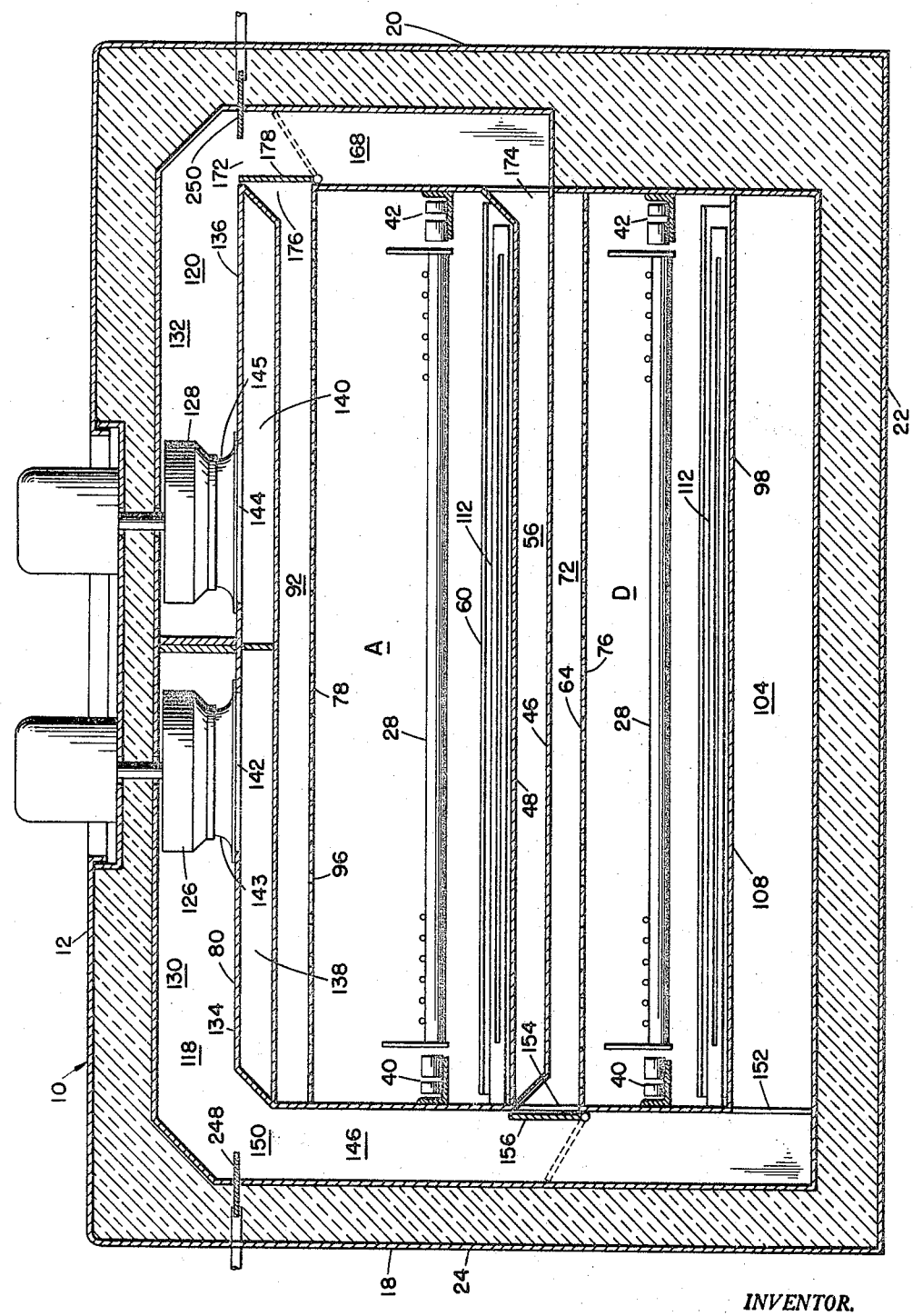

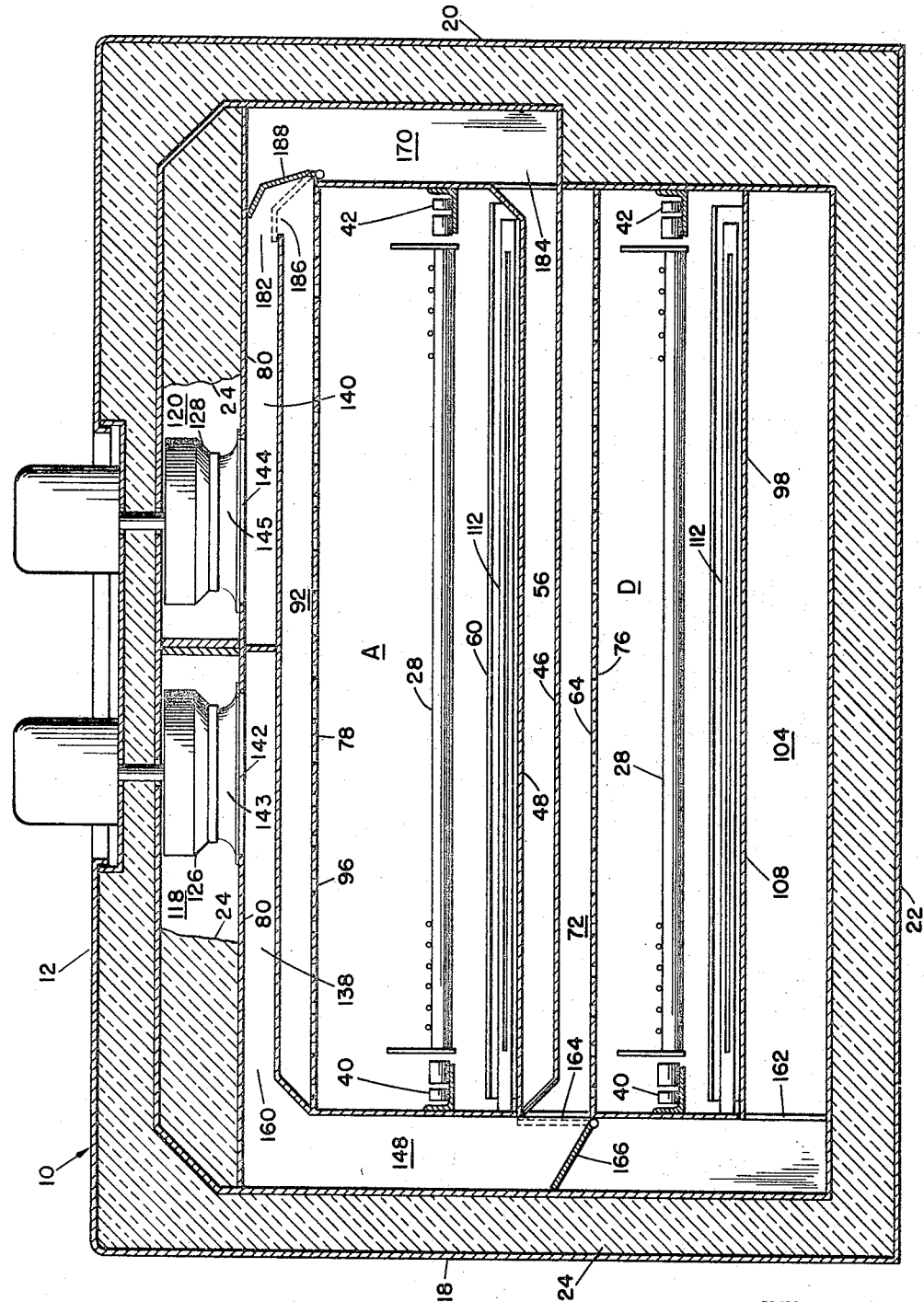

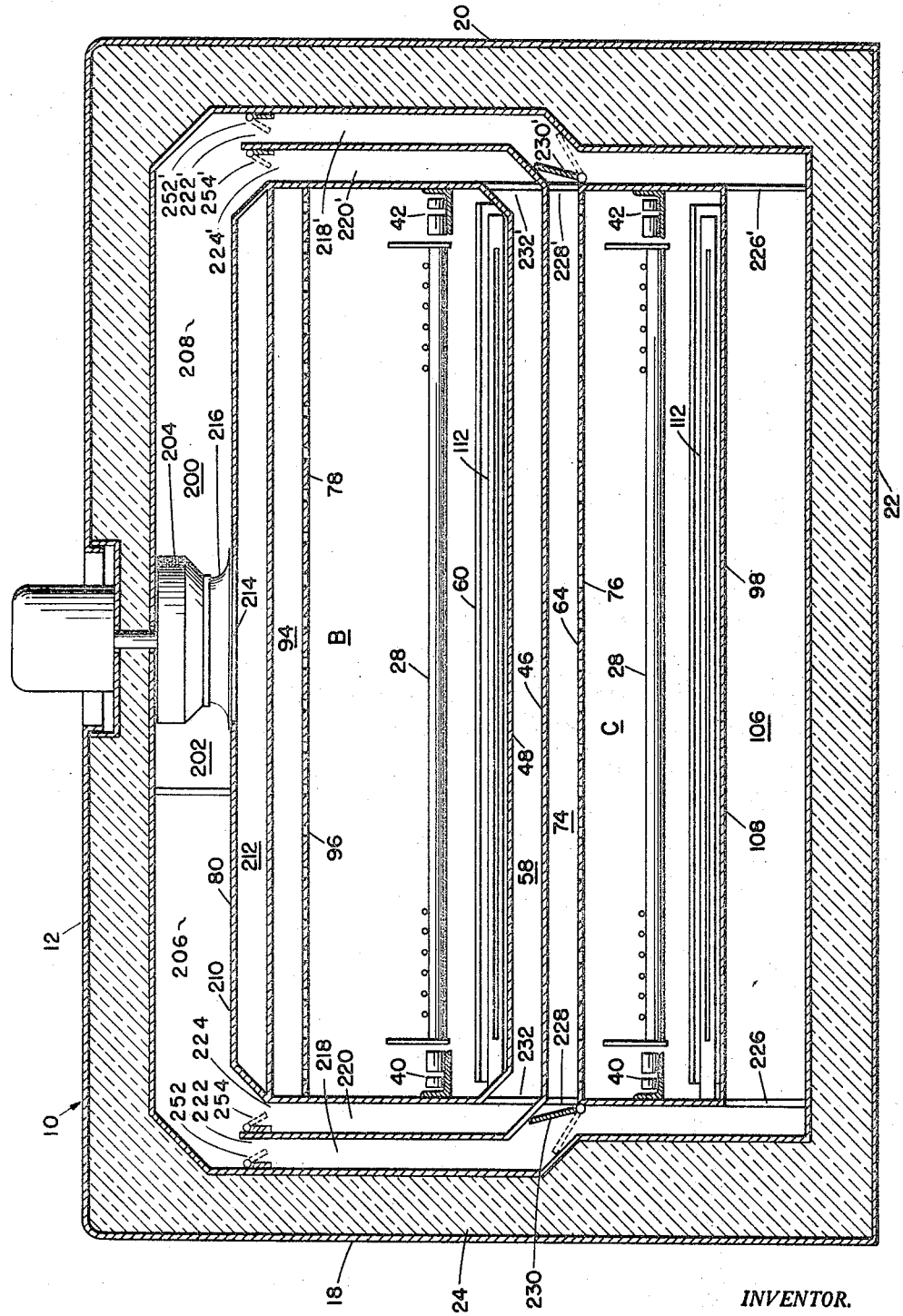

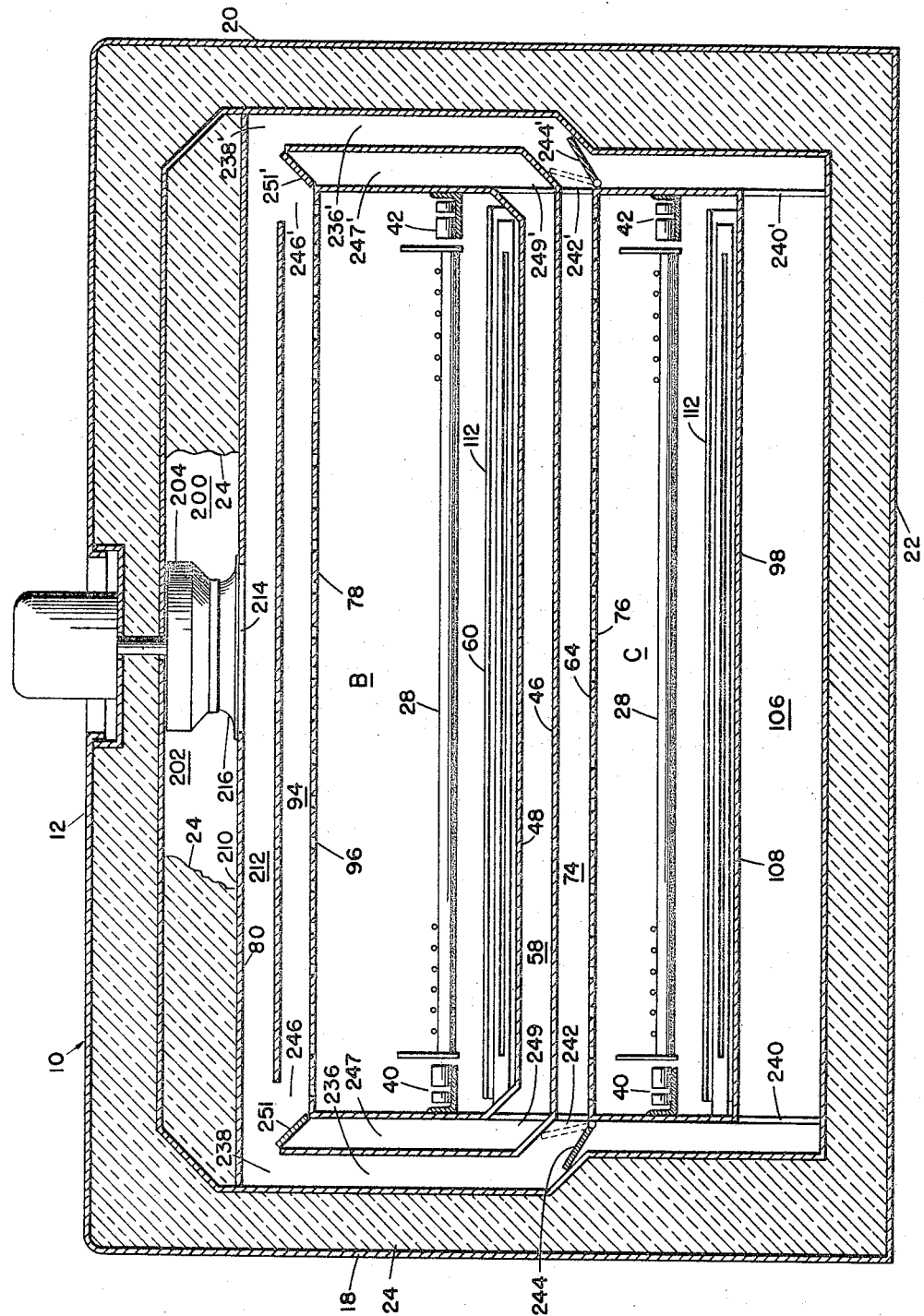

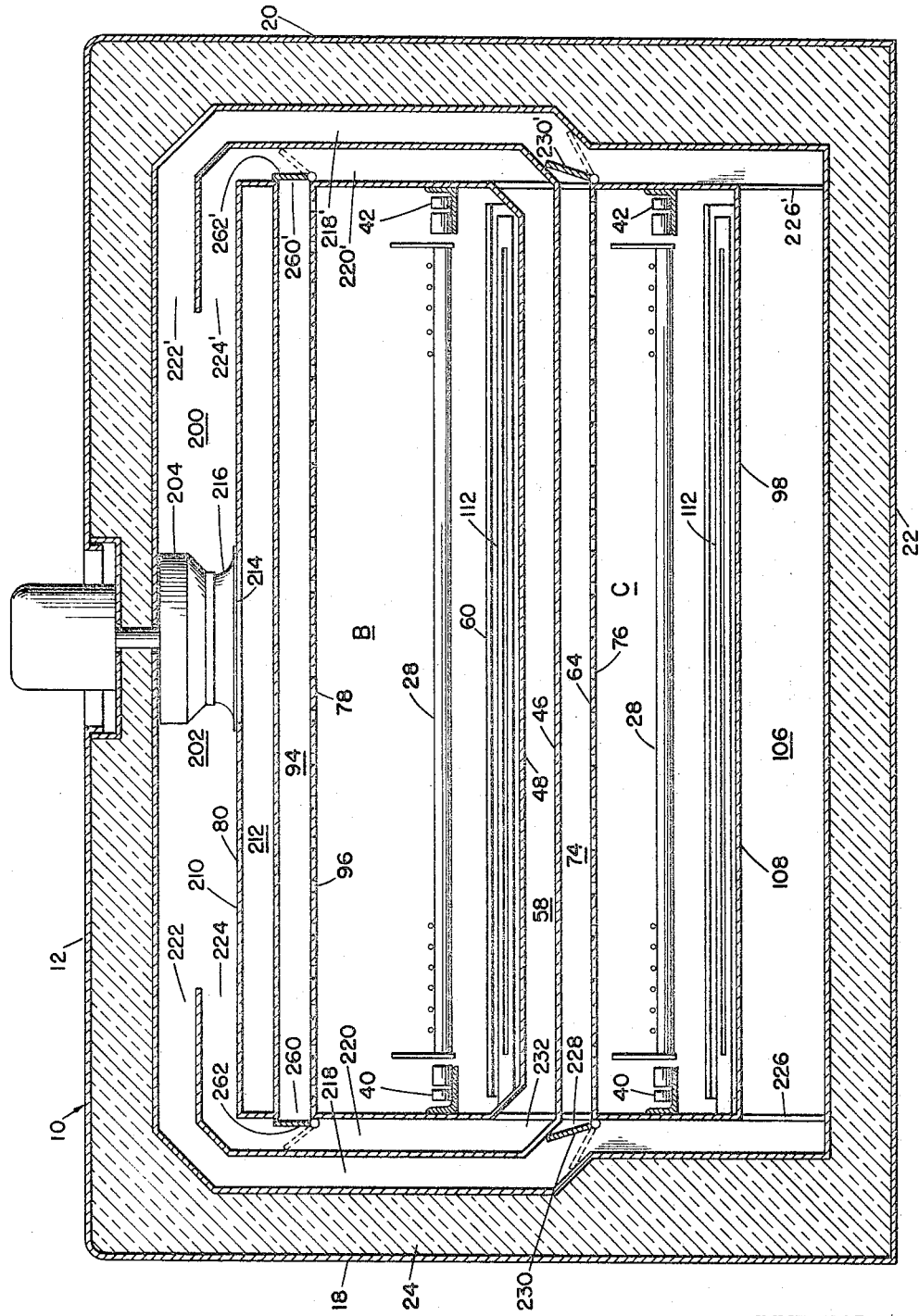

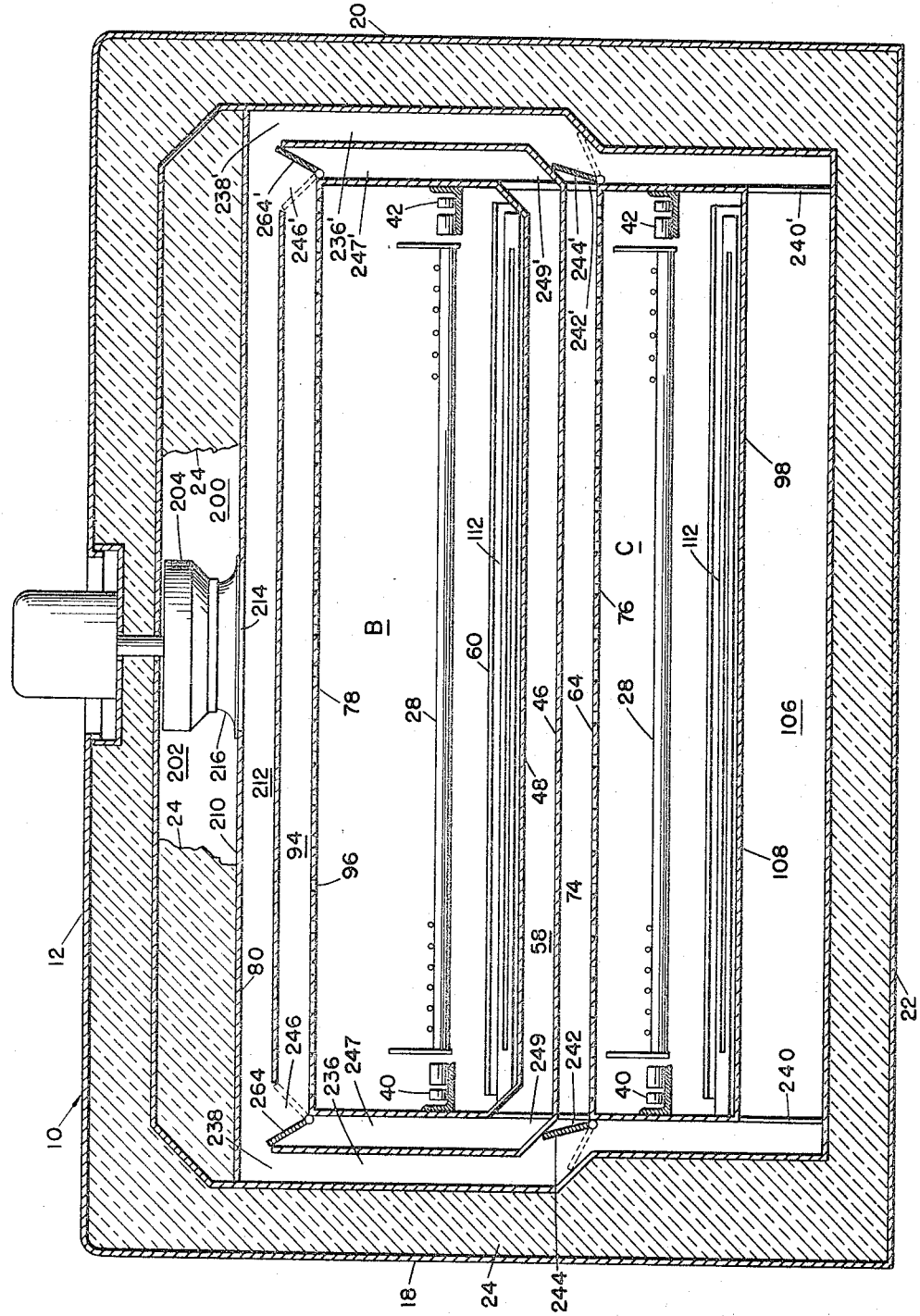

3,332,372
SINGLE LAP OVEN HEATING SYSTEM
Wayne H. Royer, York, Pa., assignor to Read Corporation, York, Pa., a corporation of Delaware
Filed Mar. 22, 1965, Ser. No. 441,443
6 Claims. (Cl. 107—57)

This invention relates to commercial baking ovens known as single lap tray type ovens wherein an endless tray conveyor moves the loaded trays from the front or loading end of the oven along a longitudinally extending upper run to the rear thereof, and then along a longitudinally extending lower run from the rear to the front of the oven, where the baked products are unloaded from the trays.

It is an object of the invention to provide in an oven of this type means for subjecting the products to be baked to variable baking conditions as they progress through longitudinally contiguous heating zones along their upper and lower runs through the baking chamber to provide in such zones optimum baking conditions for the particular product being baked, as for example cakes, pies, rolls and breads of all varieties, and for producing in such baked products desired characteristics.

In ovens of the type described there is a great disparity in the temperature and moisture content of the products in the initial and final portions of their runs through the oven, and it is an object of the invention to provide in the oven forced baking chamber atmosphere recirculating systems for the initial and final portions of the runs of the products constructed and arranged to minimize as nearly as practicable the commingling of the baking chamber atmosphere in the upper zone of the oven embracing the initial portion of the product run with the baking chamber atmosphere in the lower zone of the oven embracing the final portion of the product run. A related object is to provide means for controlling the relative volume of baking chamber atmosphere recirculated in the said upper and lower zones of the oven and a further object is to provide means for independently and selectively controlling the directional flow of recirculated baking chamber atmosphere in an upward or downward direction in said upper zone and in said lower zone of the oven.

A further object is to provide in a single lap tray type oven, a forced baking chamber atmosphere recirculating system including means dividing the baking chamber into longitudinally contiguous zones embracing the upper product run and longitudinally contiguous zones embracing the lower product run, wherein the volume of recirculated baking chamber atmosphere in each of the zones is individually controlled and wherein the directional flow of recirculated baking chamber atmosphere is independently and selectively controlled in an upward or downward direction in the upper and lower forward zones and the lower rearward zone of the baking chamber. A related object is to provide a recirculating system as described, constructed and arranged to minimize commingling of forward upper and lower zone baking chamber atmosphere one from the other and from the rearward upper and lower zone baking chamber atmosphere.

Other objects and advantages of this invention will be apparent from the following description, taken in connection with the accompanying drawings, in which:

FIGURE 2 is a sectional view taken on line 2—2 of FIGURE 1;

FIGURE 3 is a sectional view taken on irregular line 3—3 of FIGURE 2;

FIGURE 4 is a sectional view taken on irregular line 4—4 of FIGURE 2;

FIGURE 5 is a sectional view taken on line 5—5 of FIGURE 1;

FIGURE 6 is a sectional view taken on irregular line 6—6 of FIGURE 5;

FIGURE 7 is a sectional view taken on irregular line 7—7 of FIGURE 5;

FIGURE 8 is a cross sectional view through an oven taken on the same irregular line as FIGURE 6, showing a somewhat modified form of the feed duct construction of the recirculating system; and FIGURE 9 is a cross sectional view through an oven taken on the same irregular line as FIGURE 7, showing a somewhat modified form of the return duct construction of the recirculating system.

Figure 1:
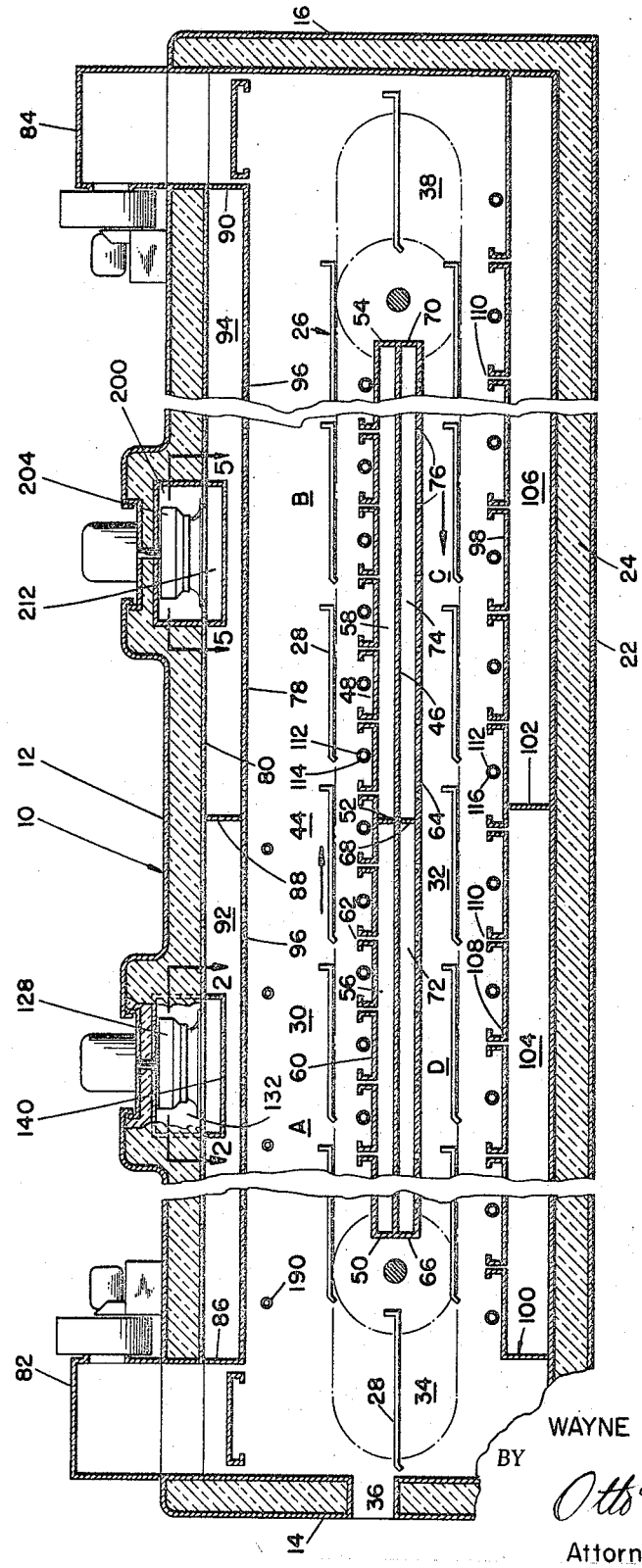
FIGURE 1 is a longitudinal vertical section through a baking oven embodying the present invention, with parts being shown in elevation.

The baking oven, as illustrated in the drawings, is in the form of a longitudinally elongated housing 10, generally rectangular in shape, defined by a top wall 12, a front wall 14, a rear wall 16, side walls 18 and 20, and a base 22. The walls are formed of spaced inner and outer plates or panels between which is interposed suitable heat insulating material, designated by reference numeral 24.

The oven, as illustrated, is of the type commonly referred to as a single lap tray type oven, wherein an endless tray conveyor 26, traveling in the direction of the arrows in FIGURE 1, conveys the trays 28 along a longitudinally extending upper run 30 from the front or loading end of the oven to the rear thereof, and along a longitudinally extending lower run 32 from the rear to the front of the oven, where the baked products are unloaded from the trays. The trays 28 are elevated from lower run 32 along an ascending run 34 adjacent an opening 36 in the front wall 14 of the oven, and are lowered from upper run 30 to lower run 32 along a descending run 38 adjacent the rear wall 16 of the oven.

The tray conveyor 26, illustrated somewhat diagrammatically in FIGURE 1, may be of any suitable form well known in the art, and includes endless chains 40 and 42, one at each side of the oven. Suitable means, conventional in the art, including sprockets and guide tracks are provided at opposite ends of the oven for guiding the chains from one to the other of said runs. A plurality of transversely extending trays 28 are pivotally supported between the chains 40 and 42 in equidistantly spaced relation. Suitable means is provided for maintaining the trays 28 in horizontal position as they are conveyed throughout the oven. Such means for stabilizing the trays is well known in the art, and since it does not constitute a part of the present invention, it has not been shown in the drawings.

By means hereinafter described the oven baking chamber 44 is divided into four baking chamber atmosphere recirculating zones; longitudinaly contiguous upper front zone A and upper rear zone B embracing upper product run 30 of endless tray conveyor 26, and longitudinally contiguous lower rear zone C and lower front zone D embracing lower product run 32 of endless tray conveyor 26.

A horizontal imperforate partition 46 is disposed approximately midway between the upper and lower runs 30 and 32 of the tray conveyor 26. The partition 46 extends laterally from the inner sheet of oven side wall 18 to the inner sheet of oven side wall 20, and longitudinally from as nearly adjacent the ascending run 34 of tray conveyor 26 as practicable to as nearly adjacent the descending run 38 of tray conveyor 26 as practicable, whereby to separate upper baking zones A and B from lower baking zones C and D. A horizontal perforate partition 48, coextensive with and spaced above partition 46, together with transverse front, intermediate and rear walls 50, 52 and 54 form with partition 46, longitudinally contiguous shallow plenum chambers 56 and 58 at the bottom of zones A and B, respectively. The perforate partition 48 is preferably formed of a plurality of transversely extending plates 60 longitudinally spaced apart to form therebetween vents or slots 62, distributed substantially uniformly over the extent of the partition 48, providing communication between plenum chamber 56 and zone A, and between plenum chamber 58 and zone B.

A horizontal perforate partition 64, coextensive with and spaced below partition 46, together with transverse front, intermediate and rear walls 66, 68 and 70 form with partition 46, longitudinally contiguous shallow plenum chambers 72 and 74 at the top of D and C, respectively. Horizontal partition 64 is provided with a plurality of apertures 76 distributed substantially uniformly over the extent thereof, providing communication between plenum chamber 74 and zone C, and between plenum chamber 72 and zone D. If desired, the partition 64 can be formed in the same manner as partition 48 to provide vents or slots in place of the apertures 76.

A horizontal perforate partition 78, disposed below the inner or crown sheet 80 of the oven top wall 12, extends laterally the width of the interior of the oven and longitudinally as nearly as practicable the length of the oven. In order to accommodate exhaust fans 82 and 84, as shown, or other appurtenances, the perforate partition 78 terminates short of the ends of the oven, however, this does not materially affect the efficient functioning of my improved oven. Horizontal perforate partition 78, together with transverse front, intermediate and rear walls 86, 88 and 90 form with crown sheet 80, longitudinally contiguous shallow plenum chambers 92 and 94 at the top of zones A and B, respectively. Partition 78 is provided with a plurality of apertures 96 distributed substantially evenly over the extent thereof, providing communication between plenum chamber 92 and zone A, and between plenum chamber 94 and zone B. If desired, the partition 78 can be formed in the same manner as partition 48 to provide vents or slots in place of the apertures 96.

A horizontal perforate partition 98, disposed above the inner sheet of the oven base 22, extends laterally the width of the interior of the oven and longitudinally as nearly as practicable the length of the oven. As illustrated in the drawings, the partition 98 terminates short of the front of the oven and extends all the way to the rear of the oven. However, if necessary to accommodate certain appurtenances, the partition 98 can terminate short of the rear of the oven without materially affecting the efficient functioning of my improved oven. Horizontal perforate partition 98, together with transverse front and intermediate walls 100 and 102 and the inner sheet of oven rear wall 16 form with the inner sheet of the oven base 22, longitudinally contiguous shallow plenum chambers 104 and 106 at the bottom zones D and C, respectively. The perforate partition 98 is preferably formed of a plurality of transversely extending plates 108 longitudinally spaced apart to form therebetween vents or slots 110, distributed substantially uniformly over the extent of the partition 98, providing communication between plenum chamber 104 and zone D, and between plenum chamber 106 and zone C.

Successive rows of pans of dough to be baked are introduced through oven opening 36 and loaded onto successive trays 28 of the tray conveyor 26. The trays 28 are preferably of open grille type construction, well known in the art. Tray conveyor 26 transports the trays 28 carrying the pans of dough successively through zones A and B along upper tray conveyor run 30 from the front to the rear of the oven and then through zones C and D along the lower or return tray conveyor run 32 from the rear to the front of the oven.

The heating system for the oven includes a plurality of transversely extending longitudinally spaced fluid fuel burners 112, which may be of any suitable conventional type, well known in the art, and are therefore not further described. The burners 112 are arranged in an upper series 114 disposed between the plenum chambers 56, 58 and the upper run 30 of the tray conveyor 26, and a lower series 116 between the plenum chambers 104, 106 and the lower run 32 of the tray conveyor 26.

Referring now more particularly to the oven atmosphere recirculating system and specifically to the recirculating system for zones A and D, a pair of laterally adjacent transversely extending housings 118 and 120 are disposed within the top wall 12 of the oven approximately midway of the ends of the zones A and D. The laterally outer end portions of the housings 118 and 120 project through the inner sheets of respective oven side walls 18 and 20 and extend into the space between the inner and outer sheets thereof, as best shown in FIG. 2. The adjacent inner end portions of the housings 118 and 120, in horizontal cross section, have a spiral shaped configuration forming fan chambers 122 and 124 for the fans 126 and 128. The remaining portions of the housings 118 and 120 form discharge ducts 130 and 132 which communicate with the discharge sides of fans 126 and 128. As shown in the drawings, the inner or crown sheet 80 of the oven top wall 12 may conveniently form the bottom walls 134 and 136 of the housing 118 and 120.

Subjacent the housings 118 and 120 are a pair of laterally adjacent transversely extending shallow collecting ducts 138 and 140 which extend, respectively, to the inner sheets of oven side walls 18 and 20. The collecting ducts 138 and 140 extend through the plenum chamber 92 and have their bottom walls disposed in spaced relation above the partition 78 that forms the bottom of the plenum chamber 92, as best shown in FIGURE 1. The bottom walls 134 and 136 of the housings 118 and 120, which walls also form top walls for the collecting ducts 138 and 140, are provided with circular openings 142 and 144 embraced by inlet rings 143 and 145 of the fans 126 and 128 providing communication between the collecting ducts 138 and 140 and the intake sides of the fans 126 and 128.

Referring now to the left side of the oven when viewed from the front thereof, a pair of side by side vertical ducts 146, FIGURE 3, and 148, FIGURE 4, are disposed within the oven side wall 18 adjacent the inner sheet thereof. The upper end of the vertical blowing duct 146 is open and communicates with the laterally outer end portion of the discharge duct 130 of housing 118 through an opening 150 in the bottom wall of the housing 118. The lower end of the blowing duct 146 communicates laterally with one side of the bottom plenum chamber 104 of the baking zone D through an opening 152 in the inner sheet of oven side wall 18. Intermediate its ends, blowing duct 146 is also arranged to communicate, through an opening 154 in the inner sheet of oven side wall 18, with the top plenum chamber 72 of the baking zone D.

A flapper valve or damper 156 is mounted in blowing duct 146 subjacent the lower edge of the opening 154 for pivotal swinging movement about a horizontal axis between its full line and phantom line positions, as shown in FIGURE 3. In the full line position of damper 156, the opening 154 is closed so that recirculated atmosphere is discharged through opening 152 into bottom plenum chamber 104; while in the phantom line position of damper 156, the blowing duct 146 is closed off below the opening 154 so that recirculated atmosphere is discharged through opening 154 into top plenum chamber 72 of the baking zone D. Any suitable means, such as an operating rod, not not shown, accessible from outside the oven, is provided for selectively moving damper 156 to one or the other of its above described positions.

The vertical return duct 148, at its upper end, is closed off by the crown sheet 80, as shown in FIGURE 4, but subjacent thereto communicates through opening 160 with collecting duct 138. The lower end of return duct 148 communicates laterally with one side of the bottom plenum chamber 104 of the baking zone D through an opening 162 in the inner sheet of oven side wall 18. Intermediate its ends, return duct 148 is also arranged to communicate, through an opening 164 in the inner sheet of oven side wall 18, with the top plenum chamber 72 of the baking zone D.

A flapper valve or damper 166 is mounted in return duct 148 subjacent the lower edge of the opening 164 for pivotal swinging movement about a horizontal axis between its full line and phantom line positions, as shown in FIGURE 4. In the full line position of damper 166, the return duct 148 is closed off below the opening 164 so that atmosphere is withdrawn through opening 164 from top plenum chamber 72 of baking zone D; while in the phantom line position of damper 166, opening 164 is closed so that atmosphere is withdrawn through opening 162 from bottom plenum chamber 104.

From the preceding description, it is seen that with the dampers 156 and 166 in their full line positions, circulation of oven atmosphere will be from fan 126 through discharge duct 130, then through blowing duct 146 into plenum chamber 104. From plenum chamber 104 the atmosphere is discharged through the vents or slots 110 into baking zone D, and since the slots 110 are distributed over the area of the plenum chamber 104, as previously described, a substantially uniform upward flow of atmosphere is provided throughout the baking zone D. The atmosphere is withdrawn from the baking zone D into the plenum chamber 72 through the apertures 76, from whence it flows through the upper half of return duct 148, collecting duct 138 and then through opening 142 to the intake side of the fan 126. Now, if it is desired to provide more top heat on the product in baking zone D, the dampers 156 and 166 are moved to their phantom line positions. Whereupon circulation of oven atmosphere will be from fan 126 through discharge duct 130, then through the upper half of blowing duct 146 into plenum chamber 72. From plenum chamber 72, the atmosphere is discharged through the apertures 76 into baking zone D, and since the apertures 76 are distributed over the area of the plenum chamber 72, as previously described, a substantially uniform downward flow of air is provided throughout the baking zone D. The atmosphere is withdrawn from the baking zone D into the plenum chamber 104 through the vents or slots 110, from whence it flows through return duct 148, collecting duct 138 and then through opening 142 to the intake side of the fan 126.

Referring now to the right side of the oven when viewed from the front thereof, a pair of side by side vertical ducts 168 and 170 are disposed within the oven side wall 20 adjacent the inner sheet thereof. The upper end of the vertical blowing duct 168 is open and communicates with the laterally outer end portion of the discharge duct 132 of housing 120 through an opening 172 in the bottom wall of the housing 120. The lower end of the blowing duct 168 communicates laterally with one side of the bottom plenum chamber 56 of the baking zone A through an opening 174 in the inner sheet of oven side wall 20. Near its upper end, blowing duct 168 is also arranged to communicate, through an opening 176 in the inner sheet of oven side wall 20, with the top plenum chamber 92 of the baking zone A.

A flapper valve or damper 178 is mounted in blowing duct 168 subjacent the lower edge of the opening 176 for pivotal swinging movement about a horizontal axis between its full line and phantom line positions, as shown in FIGURE 3. In the full line position of damper 178, the opening 176 is closed so that recirculated atmosphere is discharged through opening 174 into bottom plenum chamber 56; while in the phantom line position of damper 178, the blowing duct 168 is closed off below the opening 176 so that recirculated atmosphere is discharged through opening 176 into top plenum chamber 92 of the baking zone A. Any suitable means, such as an operating rod, not shown, accessible from outside the oven, is provided for selectively moving damper 178 to one or the other of its above described positions.

The vertical return duct 170, at its upper end, is closed off by the crown sheet 80, as shown in FIGURE 4, but subjacent thereto communicates through opening 182 with collecting duct 140. The lower end of return duct 170 communicates laterally with one side of the bottom plenum chamber 56 of the baking zone A through an opening 184 in the inner sheet of oven side wall 20. The bottom wall of the collecting duct 140, at its laterally outer end, is provided with a recess or opening 186 registering with opening 182, providing communication between top plenum chamber 92 and collecting duct 140.

A flapper valve or damper 188 is mounted in return duct 170 subjacent the lower edge of the opening 182 for pivotal swinging movement about a horizontal axis between its full line and phantom line positions, as shown in FIGURE 4. In the full line position of damper 188, the opening 182 is closed and opening 186 is open so that atmosphere is withdrawn through opening 186 from the top plenum chamber 92 into collecting duct 140; while in the phantom line position of damper 188, opening 186 is closed and opening 182 is open so that atmosphere is withdrawn through opening 184 from bottom plenum chamber 56.

From the preceding description of the duct and damper arrangement at the right side of baking zone A, it is seen that with the dampers 178 and 188 in their full line positions, circulation of oven atmosphere will be from fan 128 through discharge duct 132, then through blowing duct 168 into plenum chamber 56. From plenum chamber 56 the atmosphere is discharged through the vents or slots 62 into baking zone A, and since the slots 62 are distributed over the area of the plenum chamber 56, as previously described, a substantially uniform upward flow of atmosphere is provided throughout the baking zone A. The atmosphere is withdrawn from the baking zone A into the plenum chamber 92 through the apertures 96, from whence it flows through opening 186, collecting duct 140 and then through opening 144 to the intake side of the fan 128. Now, if it is desired to provide more top heat on the product in baking zone A or to direct more steam from conventional steam conduits 190 against the product, the dampers 178 and 188 are moved to their phantom line positions. Whereupon circulation of oven atmosphere will be from fan 128 through discharge duct 132, then through opening 176 of blowing duct 168 into the plenum chamber 92. From plenum chamber 92 the atmosphere is discharged through the apertures 96 into baking zone A, and since the apertures 96 are distributed over the area of the plenum chamber 92, as previously described, a substantially uniform downward flow of air is provided throughout the baking zone A. The atmosphere is withdrawn from the baking zone A into the plenum chamber 56 through the vents or slots 62, from whence it flows through return duct 170, opening 182, collecting duct 140 and then through opening 144 to the intake side of the fan 128.

Because of the temperature differential of the product in zones A and D and the moisture content of the atmosphere in said zones, it is desirable, as previously explained, to provide substantially mutually exclusive baking chamber atmosphere recirculating systems for said zones, and as described above, each of said recirculating systems is provided with its own fan. Since the conditions do not prevail in an important degree in zones B and C, a common fan is provided for the recirculating systems for zones B and C so that the baking chamber atmosphere from these zones is admixed prior to being recirculated.

Referring now to the oven atmosphere recirculating system for zones B and C, a transversely extending housing 200 is disposed within the top wall 12 of the oven approximately midway of the ends of the zones B and C. The laterally outer end portions of the housing 200 project through the inner sheets of respective oven side walls 18 and 20 and extend into the space between the inner and outer sheets thereof, as best shown in FIGURE 5. The intermediate portion of housing 200 is configured to form a fan chamber 202 for accommodating the fan 204. The portions of the housing 200 at opposite sides of the fan chamber 202 form discharge ducts 206 and 208 communicating with the discharge of fan 204. As shown in the drawings, the inner or crown sheet 80 of the oven top wall 12 may conveniently form the bottom wall 210 of the housing 200.

Subjacent the housing 200 is a transversely extending shallow collecting duct 212, extending from the inner sheet of oven side wall 18 to the inner sheet of oven side wall 20, as best shown in FIGURES 6 and 7. The collecting duct 212 extends through the plenum chamber 94 and has its bottom wall disposed in spaced relation above the partition 78 that forms the bottom of the plenum chamber 92, as best shown in FIGURE 1. The bottom wall 210 of the housing 200, which also forms the top wall of the collecting duct 212, is provided with a circular opening 214 embraced by the inlet ring 216 of the fan 204, providing communication between the collecting duct 212 and the intake side of fan 204.

Referring now to the left side of the oven when viewed from the front thereof, and with particular reference to FIGURES 6 and 7, a pair of vertical blowing ducts 218 and 220 are disposed in oven side wall 18 between the inner and outer sheets thereof. The upper ends of the blowing ducts 218 and 220 are open and communicate with laterally outer end portion of the discharge duct 206 of housing 200 through respective openings 222 and 224 in the bottom wall of the housing 200. The lower end of the blowing duct 218 communicates laterally with one side of the bottom plenum chamber 106 of the baking zone C through an opening 226 in the inner sheet of oven side wall 18. Intermediate its ends, blowing duct 218 is also arranged to communicate, through an opening 228 in the inner sheet of oven side wall 18, with the top plenum chamber 74 of the baking zone C. A flapper valve or damper 230 is mounted in blowing duct 218 subjacent the lower edge of the opening 228 for pivotal swinging movement about a horizontal axis between its full line and phantom line positions. The lower end of blowing duct 220 communicates laterally with one side of the bottom plenum chamber 58 of the baking zone B through an opening 232 in the inner sheet of oven side wall 18. In the full line position of damper 230, the opening 228 is closed so that recirculated atmosphere is discharged through opening 226 into bottom plenum chamber 106; while in the phantom line position of damper 230, the blowing duct 218 is closed off below the opening 228 so that recirculated atmosphere is discharged through opening 228 into the top plenum chamber 74 of the baking zone C. Any suitable means, such as an operating rod, not shown, accessible from outside the oven, is provided for selectively moving damper 230 to one or the other of its above described positions.

A vertical return duct 236 is disposed in oven side wall 18 laterally adjacent the blowing duct 218. The upper end of return duct 236 is closed off by the crown sheet 80, as shown in FIGURE 9, but subjacent thereto communicates through opening 238 with collecting duct 212. The lower end of return duct 236 communicates laterally with one side of the bottom plenum chamber 106 of the baking zone C through an opening 240 in the inner sheet of oven side wall 18. Intermediate its ends, return duct 236 is also arranged to communicate, through an opening 242 in the inner sheet of oven side wall 18, with the top plenum chamber 74 of the baking zone C.

A flapper valve or damper 244 is mounted in return duct 236 subjacent the lower edge of the opening 242 for pivotal swinging movement about a horizontal axis between its full line and phantom line positions, as shown in FIGURE 7. In the full line position of damper 244, the return duct 236 is closed off below the opening 242 so that atmosphere is withdrawn through opening 242 from top plenum chamber 74 of baking zone C; while in the phantom line position of damper 244, opening 242 is closed so that atmosphere is withdrawn through opening 240 from bottom plenum chamber 106. The bottom wall of the collecting duct 212, at its laterally outer end, is provided with a recessed opening 246 providing communication between top plenum chamber 94 of baking zone B and collecting duct 212.

In the drawings there is shown a vertical duct 247 in oven side wall 18 laterally adjacent the blowing duct 220 arranged to communicate through opening 249 in the inner sheet of oven side wall 18 with bottom plenum chamber 58 of baking zone B. The upper end of vertical duct 247 is closed off from top plenum chamber 94 and collecting duct 212 by a cover plate 251, so that atmosphere discharged into bottom plenum chamber 58 from blowing duct 220 is prevented from by-passing the baking zone B. It is evident that this same result may be attained by simply closing off the opening 249, thereby eliminating the duct 247 and cover plate 251. However, the construction as shown in FIGURES 6 and 7 is preferred for a reason hereinafter adverted to in describing the modified form of the invention shown in FIGURES 8 and 9.

The above described duct and damper arrangement at the left side of the baking zones B and C is duplicated at the right side thereof and is therefore not further described, parts at the right side being identified in the drawings by the same reference characters as similar parts at the left side with a prime mark appended thereto.

From the preceding description of the duct and damper arrangement at the sides of zones B and C, it is seen that with the dampers 230, 230' and 244, 244' in their full line positions, circulation of oven atmosphere will be from fan 204 through discharge ducts 206 and 208, then through blowing ducts 218 and 218' into opposite sides of the bottom plenum chamber 106 of baking zone C, and through blowing ducts 220 and 220' into opposite sides of the bottom plenum chamber 58 of baking zone B. From plenum chamber 106 the atmosphere is discharged through the vents or slots 110 to provide a substantially uniform upward flow of atmosphere throughout the baking zone C; and from plenum chamber 58 the atmosphere is discharged through the vents or slots 62 to provide a substantially uniform upward flow of atmosphere throughout the baking zone B. The atmosphere is withdrawn from the baking zone C into the plenum chamber 74 through the apertures 76, from whence it flows through the upper half of return ducts 236 and 236', collecting duct 212 and then through opening 214 to the intake side of the fan 204. Atmosphere is also withdrawn from the baking zone B into the plenum chamber 94 through the apertures 96, from whence it flows through openings 246 and 246' into collecting duct 212 and then through opening 214 to the intake side of the fan 204.

Now, if it is desired to provide more top heat on the product in baking zone C, the dampers 230, 230' and 244, 244' are moved to their phantom line positions. Whereupon circulation of oven atmosphere through zone B will be as before, but circulation through zone C will be from fan 204 through discharge ducts 206 and 208, then through the upper half of blowing ducts 218 and 218' into plenum chamber 74. From plenum chamber 74, the atmosphere is discharged through the apertures 76 to provide a substantially uniform downward flow of atmosphere throughout the baking zone C. The atmosphere is withdrawn from the baking zone C into the plenum chamber 106 through the vents or slots 110, from whence it flows through return ducts 236 and 236', collecting duct 212 and then through opening 214 to the intake side of the fan 204.

Horizontally adjustable slide dampers 248 and 250 are mounted in the upper ends of blowing ducts 146 and 168, respectively, for controlling the volume of air circulated through respective zones D and A. Adjustable dampers 252 and 252' are pivotally mounted in the upper ends of respective blowing ducts 218 and 218' for controlling the volume of air circulated through zone C; and adjustable dampers 254 and 254' are pivotally mounted in the upper ends of respective blowing ducts 220 and 220' for controlling the volume of air circulated through zone B.

In FIGURES 8 and 9, there is shown a modified form of atmosphere recirculating system for baking zone B. In the modified form, the top plenum chamber 94 of baking zone B is arranged to communicate with the blowing ducts 220 and 220' through openings 260 and 260' in the inner sheets of respective oven side walls 18 and 20. Flapper valves or dampers 262 and 262' are mounted in blowing ducts 220 and 220' subjacent the lower edges of the openings 260 and 260' for pivotal swinging movement about a horizontal axis between their full line and phantom line positions. Also in the modified form, the upper ends of the vertical ducts 247 and 247' are open and the cover plates 251 and 251' of the first form of the invention are replaced by flapper valves or dampers 264 and 264' mounted for pivotal swinging movement about a horizontal axis between their full line and phantom line positions.

With the dampers 262, 262' and 264, 264' in their full line position, it is evident that the circulating system provides for upward discharge of atmosphere throughout zone B in the same manner as set forth above in the description of the first form of the invention. With the dampers 262, 262' and 264, 264' in their phantom line position, the circulating system provides for downward dicharge of atmosphere throughout zone B. In this case, circulation of atmosphere will be from fan 204 through discharge ducts 206 and 208, then through the upper portion of blowing ducts 220 and 220' above the dampers 262 and 262', through openings 260 and 260' into top plenum chamber 94 of baking zone B. From plenum chamber 94, the atmosphere is discharged through the apertures 96 to provide a substantially uniform downward flow of atmosphere throughout the baking zone B. The atmosphere is withdrawn from the baking zone B into the plenum chamber 58 through the vents or slots 62, from whence it flows through openings 249 and 249' into return ducts 247 and 247', then through collecting duct 212 to the opening 214 and the intake side of the fan 204.

While the invention has been shown as applied to a direct fired oven heating system employing a series of gas burners 112 in zones A, B, C and D, it will be understood that it is equally applicable to an indirect fired oven heating system of well known conventional construction employing flues in zones A and D connected to a source of combustion gases and flues in zones B and C connected to a source of combustion gases.

As previously set forth, the present invention is more particularly concerned with an improved and novel baking chamber atmosphere recirculating system in that portion of the oven adjacent the loading and unloading end where there is the greatest disparity in the temperature and moisture content of the products during the initial and final portions of their travel through the oven. Thus, an important feature of the invention is to provide a construction and arrangement of elements whereby these zones are provided with individual baking chamber atmosphere circulating systems minimizing as nearly as practicable the admixture of the recirculated atmosphere from these zones. For comparatively short ovens this atmosphere circulating system may of course be employed throughout. In comparatively long ovens, wherein to provide the necessary amount of air, two or more longitudinally contiguous circulating systems are required, such systems may of course be duplicates of that described above in connection with zones A and D. However, in such long ovens it is obvious that in the rear portions of the ovens, the disparity in conditions between the top and bottom runs of the products is not nearly as pronounced as in the front portion of the oven, so that the recirculating systems for the rear portions of the oven can conveniently be formed as shown and described above in zones B and C. While as described above the recirculating systems of zones B and C provide flexibility and independent control of atmosphere recirculation in these zones, the atmosphere from them is admixed. Such flexibility and independent control of oven atmosphere recirculation in zones B and C is desirable to provide better control of the baking conditions. It has been found, however, that excellent results may nevertheless be obtained when the portion of imperforate wall 46 dividing zones B and C, and the portions of perforate partitions 48 and 64 that form with imperforate wall 46 the shallow plenum chambers 58 and 74 may be dispensed with and a recirculation of oven atmosphere is maintained through this portion of the oven between plenum chambers 94 and 106.

I claim:

1. In a baking chamber atmosphere recirculating system for an oven provided with an endless traveling tray conveyor for transporting products to be baked therethrough in an upper and a lower longitudinally extending run, means forming upper and lower plenum chambers disposed in spaced relation above and below a forward portion of said upper tray conveyor run defining an upper forward baking zone, means forming upper and lower plenum chambers disposed in spaced relation above and below a rearward portion of said upper tray conveyor run defining an upper rearward baking zone, means forming upper and lower plenum chambers disposed in spaced relation above and below a forward portion of said lower tray conveyor run defining a lower forward baking zone, means forming upper and lower plenum chambers disposed in spaced relation above and below a rearward portion of said lower tray conveyor run defining a lower rearward baking zone, the confronting faces of the upper and lower plenum chambers of each of said zones having a multiplicity of apertures directed toward their associated portion of said tray conveyor, first and second fan means, a valve controlled blowing duct for selectively providing communication between the discharge of said first fan means and one or the other of said upper and lower plenum chambers of said upper forward baking zone, a valve controlled return duct for selectively providing communication between the intake of said first fan means and one or the other of said upper and lower plenum chambers of said upper forward baking zone, a valve controlled blowing duct for selectively providing communication between the discharge of said second fan means and one or the other of said upper and lower plenum chambers of said lower forward baking zone, a valve controlled return duct for selectively providing communication between the intake of said second fan means and one or the other of said upper and lower plenum chambers of said lower forward baking zone, third fan means, blowing duct means providing communication between the discharge of said third fan means and the lower plenum chamber of said upper rearward baking zone, return duct means providing communication between the intake of said third fan means and the upper plenum chamber of said upper rearward baking zone, valve controlled blowing duct means for selectively providing communication between the discharge of said third fan means and one or the other of said upper and lower plenum chambers of said lower rearward baking zone, and valve controlled return duct means for selectively providing communication between the intake of said third fan means and one or the other of said upper and lower plenum chambers of said lower rearward baking zone.

2. In a baking chamber atmosphere recirculating system as set forth in claim 1, heating means between said lower plenum chambers of said upper baking zones and said upper tray conveyor run, and heating means between said lower plenum chambers of said lower baking zones and said lower tray conveyor run.

3. In a baking chamber atmosphere recirculating system for an oven provided with an endless traveling tray conveyor for transporting products to be baked therethrough in an upper and a lower longitudinally extending run, means forming upper and lower plenum chambers disposed in spaced relation above and below a forward portion of said upper tray conveyor run defining an upper forward baking zone, means forming upper and lower plenum chambers disposed in spaced relation above and below a rearward portion of said upper tray conveyor run defining an upper rearward baking zone, means forming upper and lower plenum chambers disposed in spaced relation above and below a forward portion of said lower tray conveyor run defining a lower forward baking zone, means forming upper and lower plenum chambers disposed in spaced relation above and below a rearward portion of said lower tray conveyor run defining a lower rearward baking zone, the confronting faces of the upper and lower plenum chambers of each of said zones having a multiplicity of apertures directed toward their associated portion of said tray conveyor, first and second fan means, a valve controlled blowing duct for selectively providing communication between the discharge of said first fan means and one or the other of said upper and lower plenum chambers of said upper forward baking zone, a valve controlled return duct for selectively providing communication between the intake of said first fan means and one or the other of said upper and lower plenum chambers of said upper forward baking zone, a valve controlled blowing duct for selectively providing communication between the discharge of said second fan means and one or the other of said upper and lower plenum chambers of said lower forward baking zone, a valve controlled return duct for selectively providing communication between the intake of said second fan means and one or the other of said upper and lower plenum chambers of said lower forward baking zone, third fan means, valve controlled blowing duct means for selectively providing communication between the discharge of said third fan means and one or the other of said upper and lower plenum chambers of said upper rearward baking zone and one or the other of said upper and lower plenum chambers of said lower rearward baking zone, and valve controlled return duct means for selectively providing communication between the intake of said third fan means and one or the other of said upper and lower plenum chambers of said upper rearward baking zone and one or the other of said upper and lower plenum chambers of said lower rearward baking zone.

4. In a baking chamber atmosphere recirculating system for an oven provided with an endless traveling tray conveyor for transporting products to be baked therethrough in an upper and a lower longitudinally extending run, means forming upper and lower plenum chambers disposed in spaced relation above and below a substantial length of said upper tray conveyor run defining an upper baking zone, means forming upper and lower plenum chambers disposed in spaced relation above and below a substantial length of said lower tray conveyor run defining a lower baking zone, the confronting faces of the upper and lower plenum chambers of each of said zones having a multiplicity of apertures directed toward their associated length of said tray conveyor.

first and second fan means, a first blowing duct at one side of said oven communicating at one end with the discharge of said first fan and at successively more remote distances from said first fan communicating with said upper and lower plenum chambers of said lower baking zone, valve means in said first blowing duct movable therein for selectively providing communication between said first blowing duct and one or the other of said upper and lower plenum chambers of said lower baking zone, a first return duct at said one side of said oven communicating at one end with the intake of said first fan and at successively more remote distances from said first fan communicating with said upper and lower plenum chambers of said lower baking zone, valve means in said first return duct movable therein for selectively providing communication between said first return duct and one or the other of said upper and lower plenum chambers of said lower baking zone, a second blowing duct at the opposite side of said oven communicating at one end with the discharge of said second fan and at successively more remote distances from said second fan communicating with said upper and lower plenum chambers of said upper baking zone, valve means in said second blowing duct movable therein for selectively providing communication between said second blowing duct and one or the other of said upper and lower plenum chambers of said upper baking zone, a second return duct at said opposite side of said oven communicating at one end with the intake of said second fan and at successively more remote distances from said second fan communicating with said upper and lower plenum chambers of said upper baking zone, and valve means in said second return duct movable therein for selectively providing communication between said second return duct and one or the other of said upper and lower plenum chambers of said upper baking zone.

5. In a baking chamber atmosphere recirculating system for the baking chamber of an oven provided with an endless traveling tray conveyor for transporting products to be baked through said baking chamber in an upper and a lower longitudinally extending run, horizontal partitions extending from one side wall to the other of said baking chamber and for a substantial distance lengthwise thereof forming upper and lower plenum chambers disposed in spaced relation above and below said upper tray conveyor run defining an upper baking zone, and forming upper and lower plenum chambers disposed in spaced relation above and below said lower tray conveyor run defining a lower baking zone, the confronting partitions of the upper and lower plenum chambers of each of said baking zones having a multiplicity of apertures directed toward their associated tray conveyor run, first and second fan means, a vertical blowing duct disposed in one side wall of said oven, an opening at the lower end of said blowing duct providing communication with the lower plenum chamber of said lower baking zone, means providing communication between the upper end of said vertical blowing duct and the discharge of said first fan means, an opening intermediate the ends of said vertical blowing duct providing communication with the upper plenum chamber of said lower baking zone, a pivotally mounted damper in said vertical blowing duct movable for selectively providing communication between said blowing duct and one or the other of said upper and lower plenum chambers of said lower baking zone, a vertical return duct disposed in said one side wall of said oven adjacent said blowing duct, an opening at the lower end of said return duct providing communication with the lower plenum chamber of said lower baking zone, means providing communication between the upper end of said vertical return duct and the intake of said first fan means, an opening intermediate the ends of said vertical return duct providing communication with the upper plenum chamber of said lower baking zone, a pivotally mounted damper in said vertical return duct movable for selectively providing communication between said return duct and one or the other of said upper and lower plenum chambers of said lower baking zone, a vertical blowing duct disposed in the other side wall of said oven, an opening at the lower end of said last named blowing duct providing communication with the lower plenum chamber of said upper baking zone, means providing communication between the upper end of said last named blowing duct and the discharge of said second fan means, an opening below the upper end of said last named blowing duct providing communication with the upper plenum chamber of said upper baking zone, a pivotally mounted damper in said last named blowing duct movable for selectively providing communication between said last named blowing duct and one or the other of said upper and lower plenum chambers of said upper baking zone, a vertical return duct disposed in said other side wall of said oven adjacent said second named blowing duct, an opening at the lower end of said last named return duct providing communication with the lower plenum chamber of said upper baking zone, means providing communication between the upper end of said last named return duct and the intake of said second fan means, an opening below the upper end of said last named return duct providing communication with the upper plenum chamber of said upper baking zone, and a pivotally mounted damper in said last named return duct movable for selectively providing communication between said last named return duct and one or the other of said upper and lower plenum chambers of said upper baking zone.

6. In a baking chamber atmosphere recirculating system for an oven provided with an endless traveling tray conveyor for transporting products to be baked through said baking chamber in an upper and a lower longitudinally extending run, horizontal partitions extending from one side wall to the other of said baking chamber and for a substantial distance lengthwise of the forward portion of said baking chamber, and end walls forming with said partitions, upper and lower plenum chambers disposed in spaced relation above and below the forward portion of said upper tray conveyor run defining an upper forward baking zone, and upper and lower plenum chambers disposed in spaced relation above and below the forward portion of said lower tray conveyor run defining a lower forward baking zone, the confronting partitions of the upper and lower plenum chambers of each of said baking zones having a multiplicity of apertures directed toward their associated tray conveyor run, first and second fan means, a vertical blowing duct disposed in one side wall of said oven, an opening at the lower end of said blowing duct providing communication with the lower plenum chamber of said lower baking zone, means providing communication between the upper end of said vertical blowing duct and the discharge of said first fan means, an opening intermediate the ends of said blowing duct providing communication with the upper plenum chamber of said lower baking zone, a damper pivotally mounted in said blowing duct subjacent the intermediate opening therein movable for selectively providing communication between said blowing duct and one or the other of said upper and lower plenum chambers of said lower baking zone, a vertical return duct in said one side wall of said oven adjacent said blowing duct, an opening at the lower end of said return duct providing communication with the lower plenum chamber of said lower baking zone, means providing communication between the upper end of said return duct and the intake of said first fan means, an opening intermediate the ends of said return duct providing communication with the upper plenum chamber of said lower baking zone, a damper pivotally mounted in said return duct subjacent the intermediate opening therein movable for selectively providing communication between said return duct and one or the other of said upper and lower plenum chambers of said lower baking zone, a vertical blowing duct disposed in the other side wall of said oven, an opening at the lower end of said last named blowing duct providing communication with the lower plenum chamber of said upper baking zone, means providing communication between the upper end of said last named blowing duct and the discharge of said second fan means, an opening below the upper end of said last named blowing duct providing communication with the upper plenum chamber of said upper baking zone, a damper pivotally mounted in said last named blowing duct subjacent said last named opening therein movable for selectively providing communication between said last named blowing duct and one or the other of said upper and lower plenum chambers of said upper baking zone, a vertical return duct disposed in said other side wall of said oven adjacent said second named blowing duct, an opening at the lower end of said last named return duct providing communication with the lower plenum chamber of said upper baking zone, means providing communication between the upper end of said last named return duct and the intake of said second fan means,
an opening below the upper end of said last named return duct providing communication with the upper plenum chamber of said upper baking zone, and
a damper pivotally mounted in said last named return duct subjacent said last named opening therein movable for selectively providing communication between said last named return duct and one or the other of said upper and lower plenum chambers of said upper baking zone.

References Cited

UNITED STATES PATENTS 3,272,156  9/1966  Gilgore et al. _____ 107—57

WALTER A. SCHEEL, *Primary Examiner.*

J. SHEA, *Assistant Examiner.*